(12) United States Patent
Franklin et al.

(10) Patent No.: US 9,103,512 B2
(45) Date of Patent: Aug. 11, 2015

(54) ELECTRONIC DEVICE WITH DISPLAY BACKLIGHT ALIGNMENT STRUCTURES

(71) Applicant: Apple Inc., Cupertino, CA (US)

(72) Inventors: Jeremy C. Franklin, San Francisco, CA (US); Kevin D. Gibbs, San Carlos, CA (US); Amy Qian, San Jose, CA (US); John Raff, Menlo Park, CA (US); Jiang Ai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 13/770,169

(22) Filed: Feb. 19, 2013

(65) Prior Publication Data

US 2014/0092583 A1 Apr. 3, 2014

Related U.S. Application Data

(60) Provisional application No. 61/707,775, filed on Sep. 28, 2012.

(51) Int. Cl.
*G02F 1/1335* (2006.01)
*F21S 2/00* (2006.01)
*F21V 17/10* (2006.01)
*G06F 1/16* (2006.01)
*G02F 1/1333* (2006.01)

(52) U.S. Cl.
CPC . *F21S 2/00* (2013.01); *F21V 17/10* (2013.01); *G02F 1/1333* (2013.01); *G02F 1/133308* (2013.01); *G02F 1/133608* (2013.01); *G06F 1/1626* (2013.01); *G06F 1/1637* (2013.01); *G06F 1/1643* (2013.01); *G02F 2001/133322* (2013.01); *G02F 2001/133325* (2013.01); *G02F 2001/133354* (2013.01); *Y10T 29/49769* (2015.01)

(58) Field of Classification Search
CPC .................... G02F 1/133308; G02F 1/133608
USPC ......................................................... 349/58
See application file for complete search history.

(56) References Cited

U.S. PATENT DOCUMENTS

| 7,808,608 | B2 | 10/2010 | Park et al. |
| 8,212,969 | B2 | 7/2012 | Kim et al. |
| 2010/0245271 | A1* | 9/2010 | Park ............................ 345/173 |
| 2011/0109846 | A1 | 5/2011 | Liao |
| 2012/0140143 | A1 | 6/2012 | Wurzel |

FOREIGN PATENT DOCUMENTS

EP 2264507 12/2010

* cited by examiner

*Primary Examiner* — Phu Vu

(74) *Attorney, Agent, or Firm* — Treyz Law Group; Kendall P. Woodruff

(57) ABSTRACT

Electronic devices may include displays having backlight structures and display layers. The display layers may include alignment features. The backlight structure may include alignment features. The alignment features on the backlight structures may include transparent portions of the backlight structures. The alignment features on the display layers may include alignment marks that are visible through the transparent portions of the backlight structures. The transparent portions of the backlight structures may include openings that extend from a first surface of the backlight structures to an opposing second surface of the backlight structures. The openings may be filled by transparent members formed from plastic or glass. The transparent members may include additional alignment marks. The transparent members may include lensing portions that magnify the alignment marks on the display layers when viewed through the lensing portions.

23 Claims, 20 Drawing Sheets

ELECTRONIC DEVICE WITH DISPLAY BACKLIGHT ALIGNMENT STRUCTURES

This application claims priority to U.S. provisional patent application No. 61/707,775 filed Sep. 28, 2012, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size, weight, electrical grounding, robustness, ease of assembly, and light-tightness are often important considerations in designing electronic devices. If care is not taken, displays may be bulky, may exhibit undesired light reflections, or may be prone to damage during a drop event. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may have display layers for displaying images. Backlight structures may be included in the display. The backlight structures may generate light that illuminates the display layers in the display that are displaying an image for a user.

The backlight structures and the display layers may include alignment features that are used to align the backlight structures to the display layers during assembly of the electronic device. During assembly, the display layers may be attached to a transparent cover layer for the device. The backlight structures may be aligned with the display layers using the alignment features on the backlight structures and the alignment features on the display layers.

The alignment features on the display layers may include alignment marks that are screen printed, etched, carved, embedded or otherwise formed on a transparent substrate layer such as a color filter glass layer or a thin-film transistor glass layer of the display. The alignment features on the backlight structures may include an opening in a peripheral plastic support structure of the backlight structures.

The opening may extend from a surface of the plastic support structure to an opposing surface of the support structure so that the alignment features on the display layers can be viewed through the openings by a camera in a display assembly system.

The opening may be empty or may be filled with a transparent filler material such as plastic or glass. In one suitable example, the plastic support structure may be formed in a two-shot molding process in which a first shot of plastic is used to form the support structure and a second shot of transparent plastic is used to form a transparent member.

The transparent member may include alignment marks on a surface of the transparent member or embedded within the transparent member.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
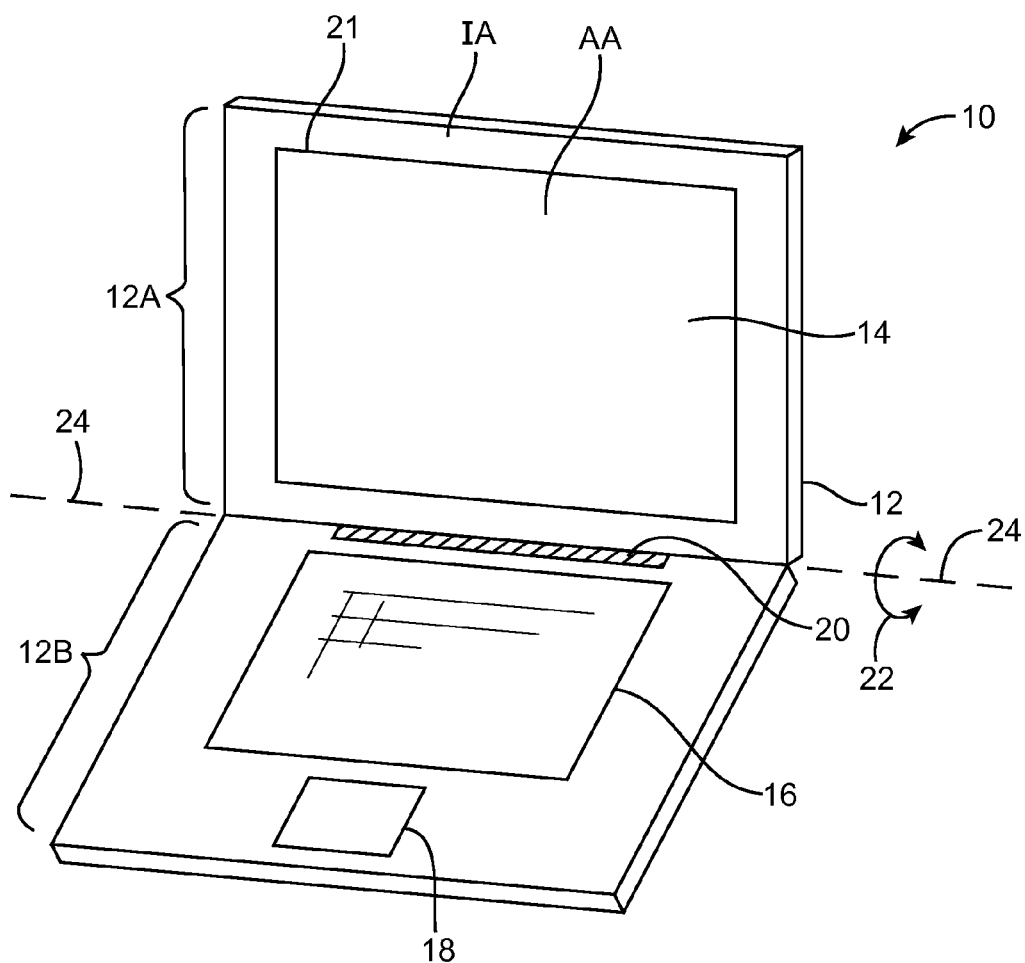
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
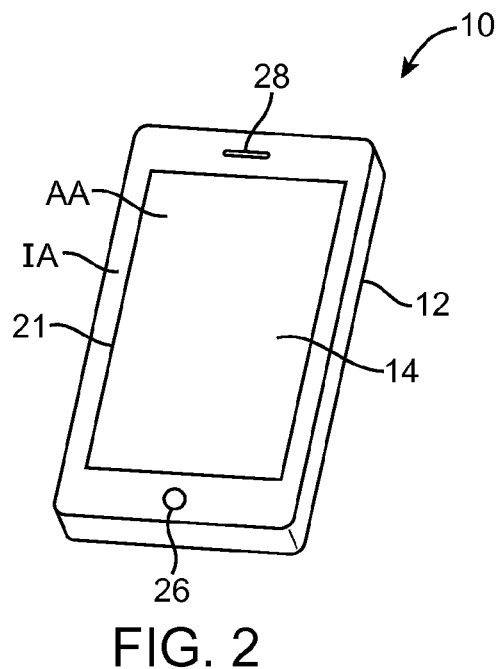
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
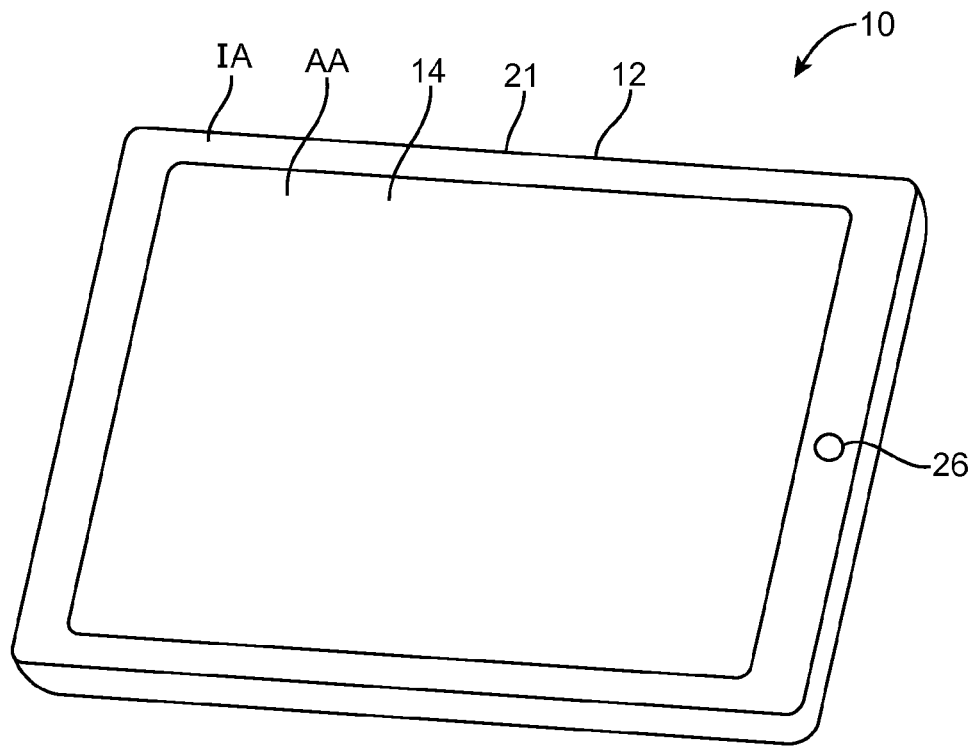
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

Peripheral portions of display 14 may be provided with an opaque masking layer. As shown in FIGS. 1, 2, and 3, display 14 may be characterized by a central active region such as active region AA in which an array of display pixels is used in displaying information for a user. Active region AA may be surrounded by an inactive region such as inactive border region IA. Active region AA may have a rectangular shape bordered by rectangular line 21. Inactive region IA may have a rectangular ring shape that surrounds active region AA (as an example). The underside of the display cover layer in inactive region IA may be covered with an opaque masking layer such as a layer of black ink (e.g., a polymer filled with carbon black). The opaque masking layer may help hide components in the interior of device 10 in inactive region IA from view by a user.

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch-sensor or may be insensitive to touch. Touch-sensors for display 14 may be formed from an array of capacitive touch-sensor electrodes, a resistive touch array, touch-sensor structures based on acoustic touch, optical touch, or force-based touch technologies, or other suitable touch-sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch-sensor components such as an array of capacitive touch-sensor electrodes formed from transparent materials such as indium tin oxide may be formed on the underside of a display cover layer, may be formed on a separate display layer such as a glass or polymer touch-sensor substrate, or may be integrated into other display layers (e.g., substrate layers such as a thin-film transistor layer).

Figure 4:
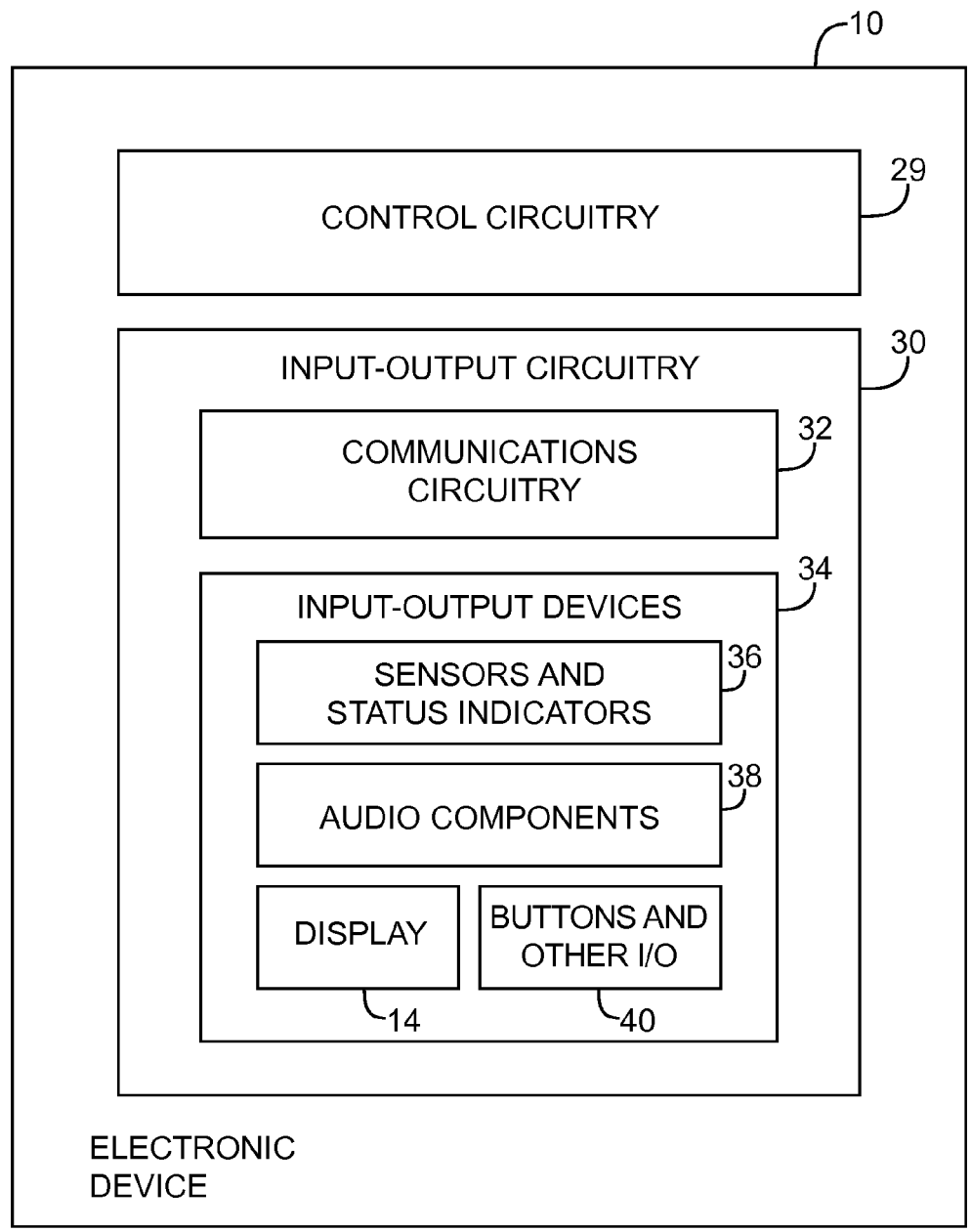
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch-sensor array that is formed as one of the layers in display 14.

User input may be gathered using buttons and other input-output components 40 such as touch pad sensors, buttons, joysticks, click wheels, scrolling wheels, touch-sensors such as sensors 36 in display 14, key pads, keyboards, vibrators, cameras, and other input-output components.

Figure 5:
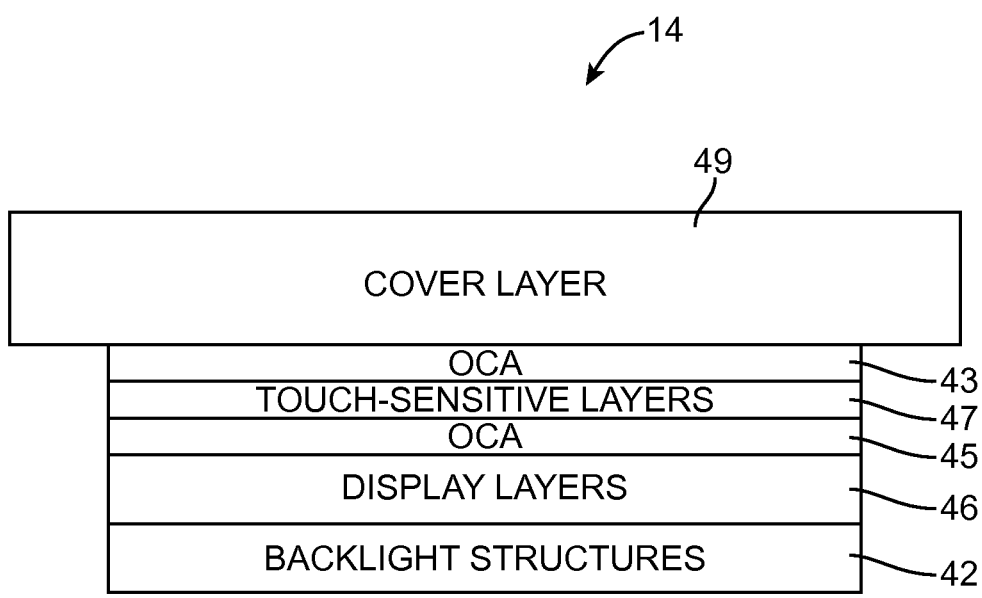
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include one or more layers of touch-sensitive components such as touch-sensitive layers 47 that are attached to a cover layer such as cover layer 49. Cover layer 49 may be formed from a sheet of rigid or flexible transparent material such as glass or plastic.

Touch-sensitive layers 47 may be attached to cover layer 49 using an adhesive material such as optically clear adhesive (OCA) 43. Adhesive 43 may be a liquid adhesive, light-cured adhesive, pressure-sensitive adhesive or other suitable adhesive. Touch-sensitive layers 47 may include touch-sensor components such as an array of capacitive touch-sensor electrodes formed from transparent materials such as indium tin oxide.

Display 14 may include display layers such as layers 46 for generating images to be displayed on display 14. Display layers 46 may include polarizer layers, color filter layers, transistor layers, adhesive layers, layers of liquid crystal material, or other layers for generating display images. Display layers 46 may be attached to touch-sensitive layers 47 using adhesive such as optically clear adhesive 45. Adhesive 45 may be a liquid adhesive, light-cured adhesive, pressure-sensitive adhesive or other suitable adhesive.

Display layers 46 may use light generated by light-generating structures such as backlight structures 42 to form images to be viewed by a user of device 10. Backlight structures 42 may include light-generating components such as light-emitting diodes, light guiding structures, reflective structures, optical films, etc. Backlight structures 42 may be attached to display layers 46 or may be mounted adjacent to layers 46 by attaching backlight structures 42 to one or more structural members.

Figure 6:
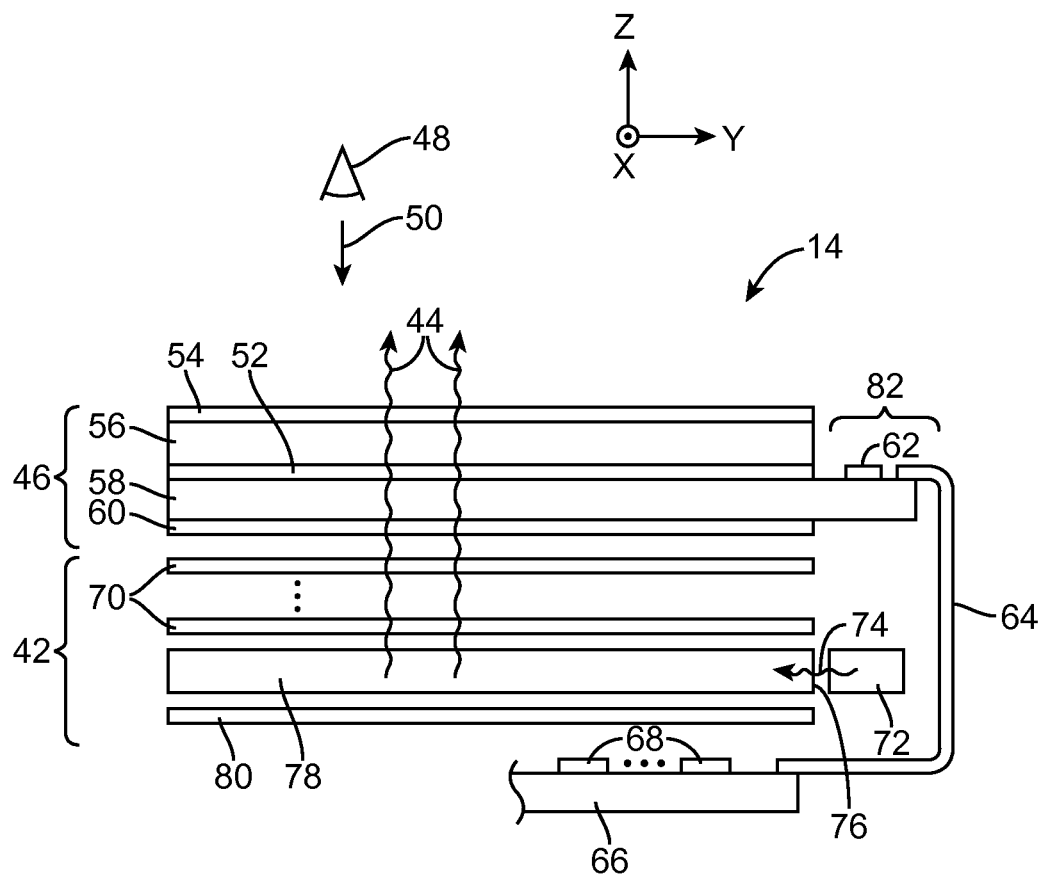
FIG. 6 is a cross-sectional side view of illustrative display layers and backlight structures in accordance with an embodiment of the present invention.

A cross-sectional side view of an illustrative configuration that may be used for display layers 46 and backlight structures 42 of display 14 (e.g., for display layers 46 and backlight structures 42 of the display of FIG. 5, or other suitable display) is shown in FIG. 6. As shown in FIG. 6, display 14 may include backlight structures such as backlight unit 42 for producing backlight 44. During operation, backlight 44 travels outwards (vertically upwards in dimension Z in the orientation of FIG. 6) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12) to laminated to a cover layer such as cover 49 of FIG. 5. Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. If desired, upper polarizer layer 54 may be attached to an outer cover layer such as cover layer 49 (FIG. 5).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch-sensor electrodes may also be incorporated into layers such as layers 58 and 56 and/or touch-sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 6) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64.

Printed circuit 66 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 64 and 66 may be formed from a combination of rigid and flexible printed circuit layers (e.g., printed circuit 66 may be formed from a rigid printed circuit board with a layer of flexible printed circuitry that extends from an edge of printed circuit 66 to form flexible printed circuitry 64 that attaches to thin-film-transistor layer 58).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 6, optical films 70 and reflector 80 may have a matching rectangular footprint.

Figure 7:
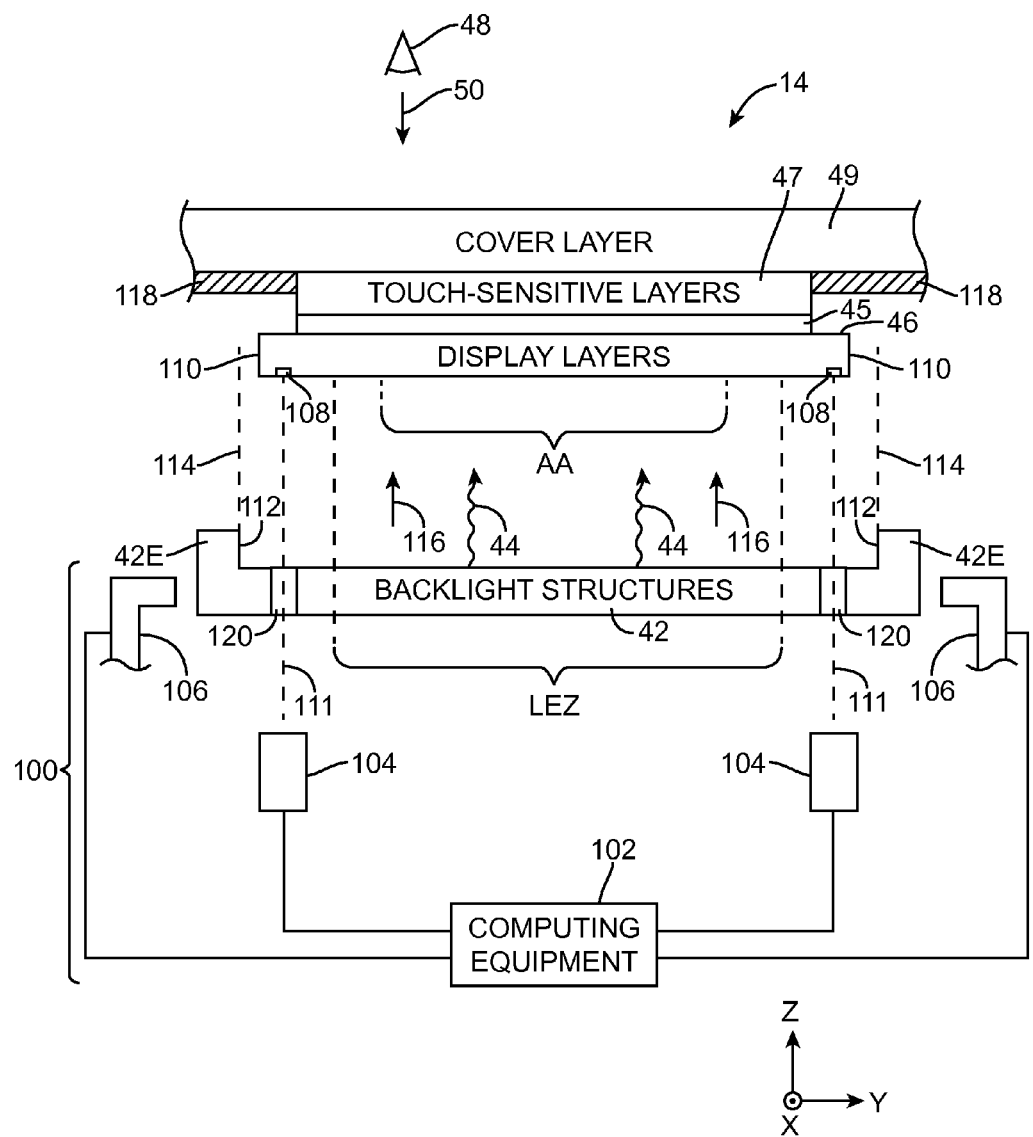
FIG. 7 is a cross-sectional side view of an illustrative display during assembly showing how an assembly system may use alignment structures on backlight structures and on display layers to align the backlight structures to the display layers in accordance with an embodiment of the present invention.

During assembly of display 14, backlight structures 42 may be aligned with display layers 46 as shown in FIG. 7. A system such as assembly system 100 for assembling display 14 and, if desired, other portions of device 10, may include one or more cameras 104, actuating members 106, and computing equipment 102 for controlling cameras 104 and actuating members 106.

Actuating member 106 may be used to hold and move backlight structures 42 based on alignment data obtained using cameras 104. Cameras 104 may view alignment features such as alignment marks 108 on display layers 46 through alignment features such as transparent portions 120 of backlight structures 42 along directions 111. Actuating members 106 may move backlight structures 42 in a direction parallel to the x-y plane of FIG. 4 until alignment marks 108 on display layers 46 are in a suitable (aligned) position with respect to transparent portions 120 of backlight structures 42.

Actuating members 106 may also move backlight structures along direction 116 (i.e., parallel to the z-direction of FIG. 4) into position adjacent to display layers 46. Following alignment and placement of backlight structures 42, backlight structures 42 may be secured in housing 12 by attaching backlight structures 42 to display layers 46 using an optically clear adhesive or by attaching backlight structures 42 mechanically to cover layer 49 and/or housing 12 (see, e.g., FIG. 1) using screws, adhesive, clips, or other attachment members (as examples).

Alignment system 100 may use alignment marks 108 and transparent portions 120 of backlight structures 42 to alight a light-emitting zone (LEZ) of the backlight structures with the active area (AA) of the display layers. Alignment system 100 may use alignment marks 108 and transparent portions 120 of backlight structures 42 to prevent edges 112 of extended portions 42E of backlight structures 42 from colliding with edge portions 110 of display layers 46 during display assembly operations (as edges 112 move in direction 116 along paths 114).

Display 14 may include an opaque masking layer such as layer 118 that at least partially covers inactive edge portions of the display surrounding active area AA. The underside of the display cover layer 49 in inactive region IA may be covered with opaque masking layer 118. Layer 118 may be formed from an opaque material such as a layer of black ink (e.g., a polymer filled with carbon black). The opaque masking layer may help hide components in the interior of device 10 in inactive region IA from view by a user such as viewer 48 viewing display 14 in a direction such as direction 50. However, layer 118 may also make it difficult to view alignment marks 108 on display layers 118 through cover layer 49. For this reason, transparent portions 120 of backlight structures 42 may be used to align backlight structures 42 to display layer 46 during assembly operations.

Figure 8:
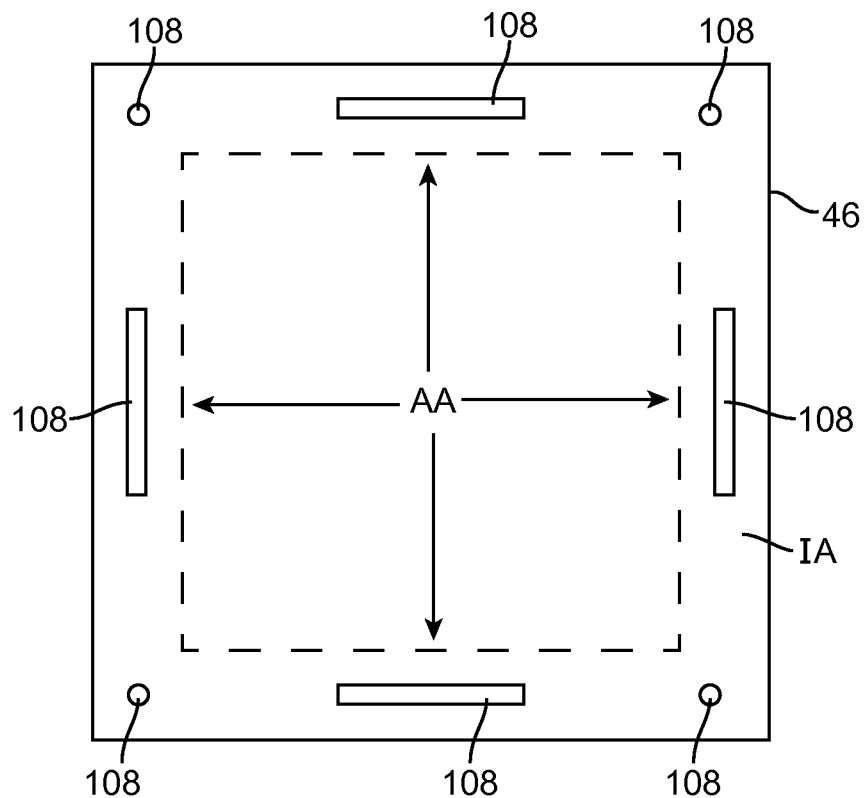
FIG. 8 is a top view of illustrative display layers with alignment structures located in an inactive area of the display in accordance with an embodiment of the present invention.

FIG. 8 is a top view of display layers 46 showing how alignment structures such as alignment marks 108 may be located in inactive area IA. As shown in FIG. 8, alignment marks 108 may include alignment marks located near corners of display layers 46 and/or alignment marks located along edges of display layers 46. Alignment marks 108 may include alignment marks that indicate points on display layers 46 (e.g., cross hairs, etc.) or alignment marks that indicate lines on display layers 46 (e.g., elongated lines that represent distances from edges of display layers or from edges of active area AA).

Figure 9:
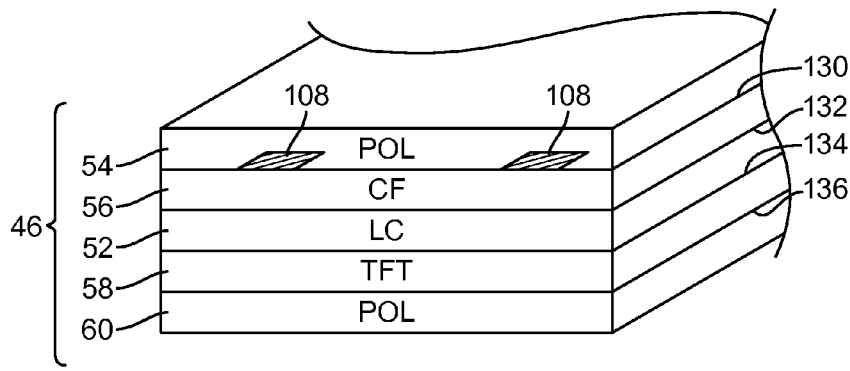
FIG. 9 is a perspective view of illustrative display layers with alignment structures on a top surface of a color filter layer in accordance with an embodiment of the present invention.
Figure 10:
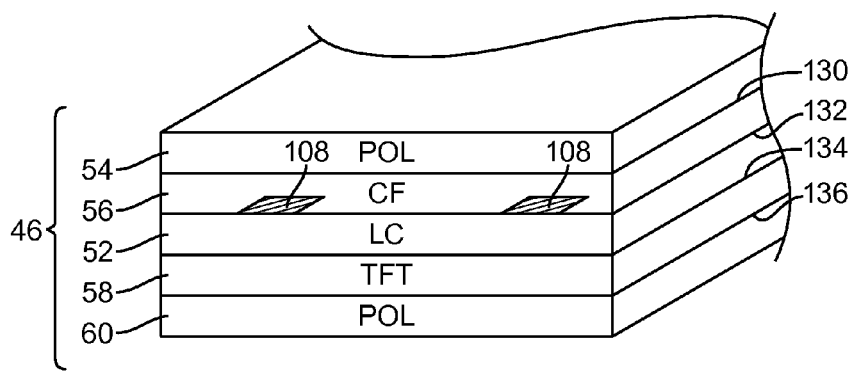
FIG. 10 is a perspective view of illustrative display layers with alignment structures on a bottom surface of a color filter layer in accordance with an embodiment of the present invention.
Figure 11:
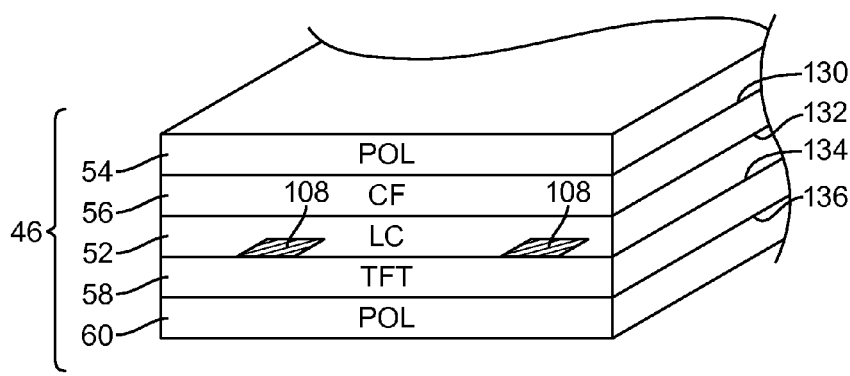
FIG. 11 is a perspective view of illustrative display layers with alignment structures on a top surface of a thin-film transistor layer in accordance with an embodiment of the present invention.
Figure 12:
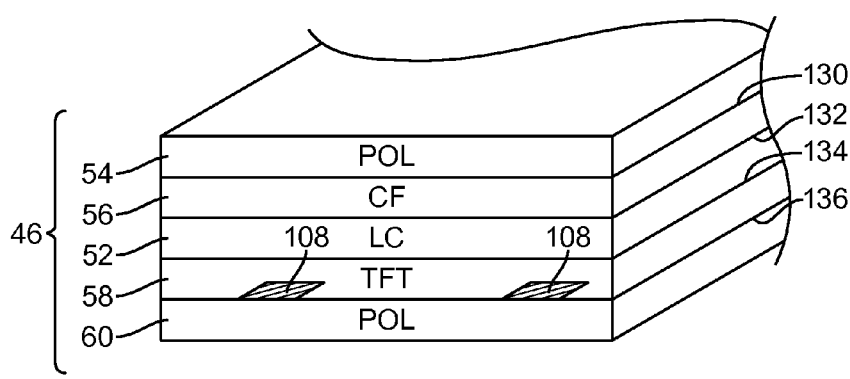
FIG. 12 is a perspective view of illustrative display layers with alignment structures on a bottom surface of a thin-film transistor layer in accordance with an embodiment of the present invention.

FIGS. 9, 10, 11, and 12 show various locations within display layers 46 of display 14 at which alignment marks 108 may be formed. As shown in FIG. 9 alignment marks 108 may be formed on top surface 130 of color filter layer 56. As shown in FIG. 10 alignment marks 108 may be formed on bottom surface 132 of color filter layer 56. As shown in FIG. 11 alignment marks 108 may be formed on top surface 134 of thin-film transistor layer 58. As shown in FIG. 12 alignment marks 108 may be formed on bottom surface 136 of thin-film transistor layer 58.

Figure 13:
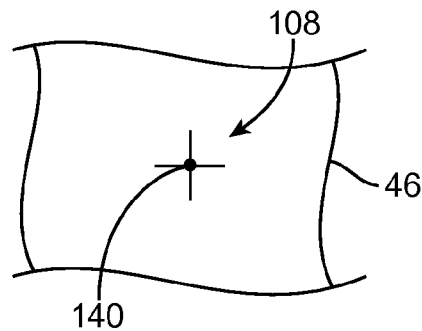
FIG. 13 is a top view of illustrative display layers showing how alignment structures on the display layers may include cross-hairs formed on the display layers in accordance with an embodiment of the present invention.

FIGS. 13, 14, 15, and 16, show various examples of alignment marks that may be used to indicate a point on display layers 46. As shown in FIG. 13, alignment marks 108 may be cross hairs that indicate the location of point 140 on display layers 46. Point 140 may be located at a specific, known distance from other alignment marks 108 or from a center point on display layers 46.

Figure 14:
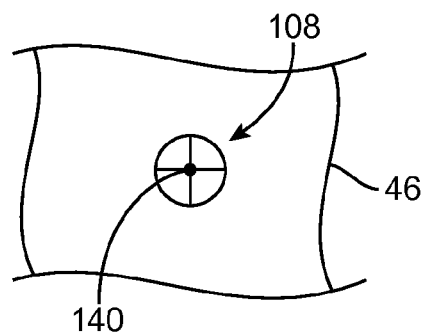
FIG. 14 is a top view of illustrative display layers showing how alignment structures on the display layers may include encircled cross-hairs formed on the display layers in accordance with an embodiment of the present invention.
Figure 15:
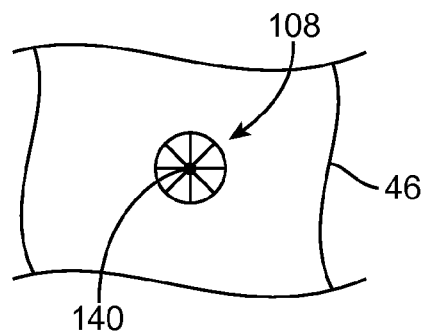
FIG. 15 is a top view of illustrative display layers showing how alignment structures on the display layers may include more than two crossed lines formed on the display layers in accordance with an embodiment of the present invention.
Figure 16:
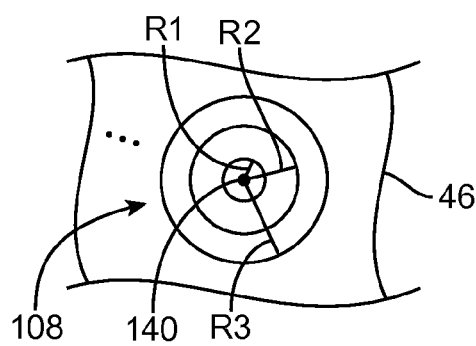
FIG. 16 is a top view of illustrative display layers showing how alignment structures on the display layers may include alignment rings with various radii formed on the display layers in accordance with an embodiment of the present invention.

As shown in FIG. 14, alignment marks 108 may be encircled cross hairs that indicate the location of point 140. As shown in FIG. 15, alignment marks 108 may be encircled cross hairs having more than two crossing lines that indicate the location of point 140. As shown in FIG. 16, alignment marks 108 may be a series of circular marks that indicate the location of point 140. In the example of FIG. 16, circular alignment marks may have known radii such as radii R1, R2, and R3. Radii R1, R2, and R3 may indicate distances from point 140 and may be used by system 100 to determine the accuracy of the alignment of backlight structures 42 with display layers 46 during display assembly operations. The alignment marks of FIGS. 13, 14, 15, and 16 are merely illustrative. Alignment marks may be used that have any suitable shape or pattern such as one or more combinations of the alignment marks of FIGS. 13, 14, 15, and 16.

Figure 17:
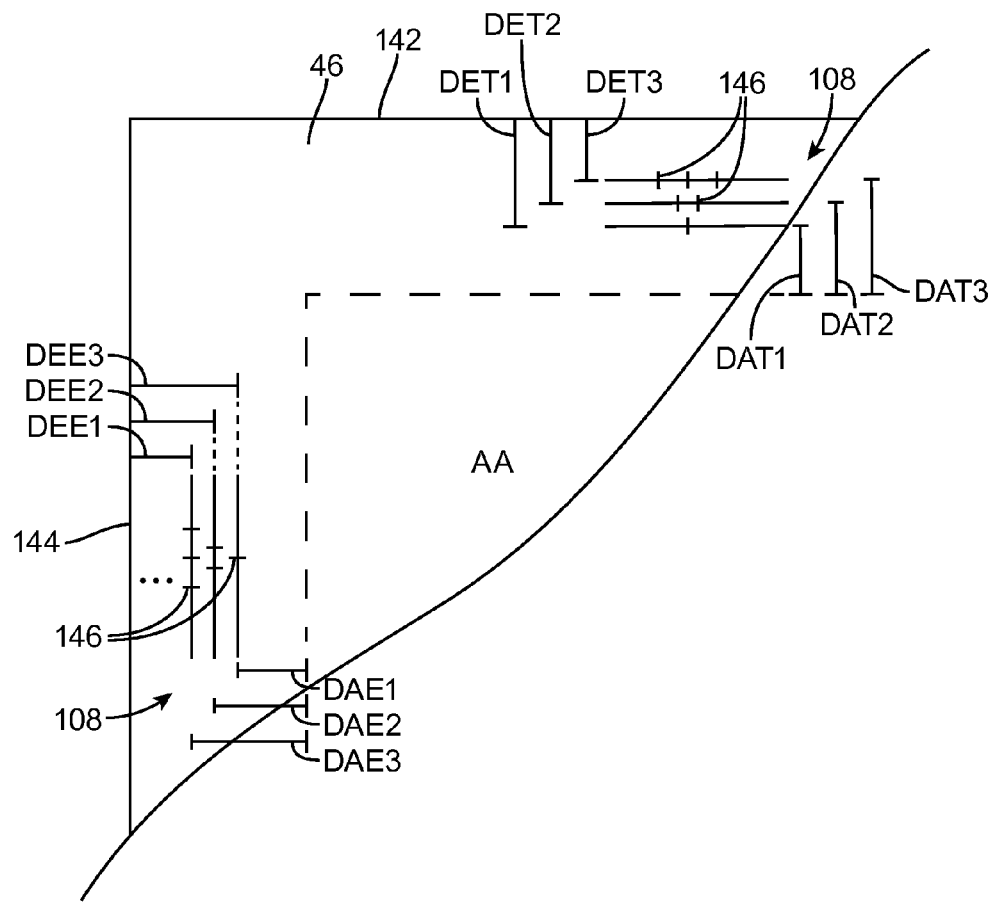
FIG. 17 is a top view of illustrative display layers showing how alignment structures on the display layers may include cross-hatched linear distance indicators formed on the display layers in accordance with an embodiment of the present invention.

FIG. 17 is a top view of display layers 46 showing how alignment structures 108 may be formed from elongated linear distance indicators. In the example of FIG. 17, alignment marks 108 include three lines along each edge of display layers 46 that extend in a direction parallel to that edge. Each linear extended alignment mark may include one or more cross hatches 146 that help identify a particular alignment mark.

Alignment marks 108 that are formed along top edge 142 may be used to indicate distances such as distances DET1, DET2, and DET3 from top edge 142. However, this is merely illustrative. Alignment marks 108 along top edge 142 may be used to indicate distances such as distances DAT1, DAT2, and DAT3 from active area AA. Alignment marks 108 that are formed along side edge 144 may be used to indicate distances such as distances DEE1, DEE2, and DEE3 from side edge 144. However, this is merely illustrative. Alignment marks 108 along side edge 144 may be used to indicate distances such as distances DAE1, DAE2, and DAE3 from active area AA.

Actuating members 106 of system 100 (see FIG. 7) may be used to move backlight structures 42 until one or more features and/or alignment structures on backlight structures 42 are aligned with one of the linear alignment marks 108 on display layers 46. If desired, display layers 46 may include linear extended alignment marks of the type shown in FIG. 17 and point-indicating alignment marks of the types shown in FIGS. 13-16 that may be used in combination during display assembly operations.

Figure 18:
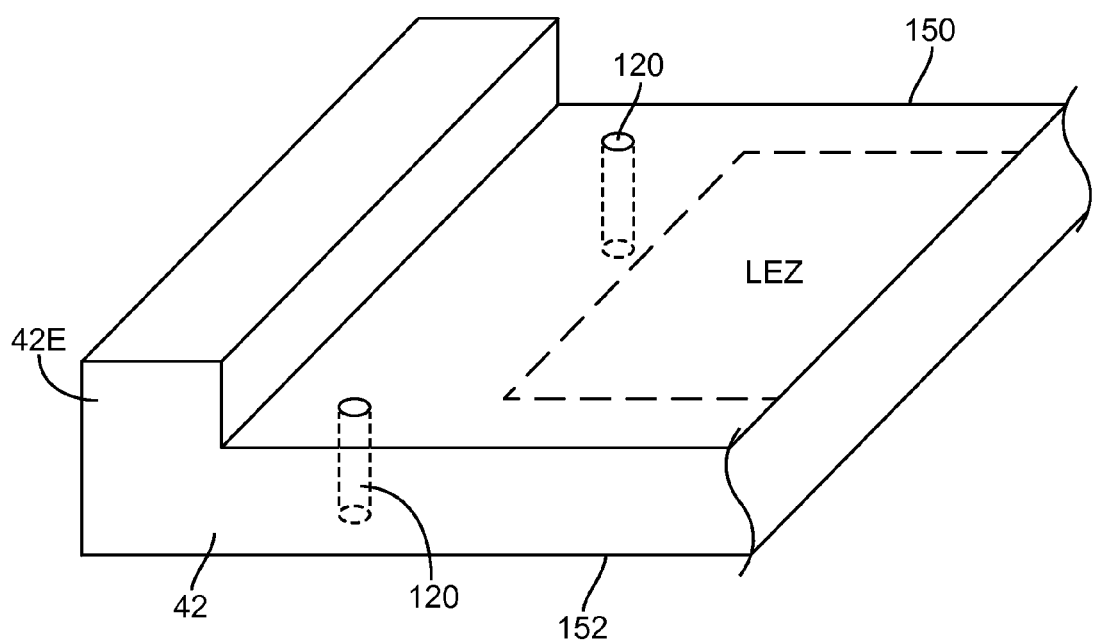
FIG. 18 is a perspective view of illustrative backlight structures with alignment structures located outside of the light-emitting zone of the backlight structures in accordance with an embodiment of the present invention.

FIG. 18 is a perspective view of backlight structures 42 showing how alignment structures 120 may be formed from transparent portions of backlight structures 42 that are located outside of the light-emitting zone of the backlight structures. As shown in FIG. 18, transparent portions 120 may extend from inner surface 150 to outer surface 152 of backlight structures 42. Transparent portions 120 may be openings in backlight structures 42. Openings in backlight structures 42 may be formed by mechanical or laser drilling (as examples) holes in a peripheral plastic portion of structures 42.

Transparent portions 120 may be openings that are substantially empty or openings that are filled with a transparent member such as plastic or glass. Transparent portions 120 that are formed from openings that are filled with transparent members may include alignment marks on the transparent members.

Figure 19:
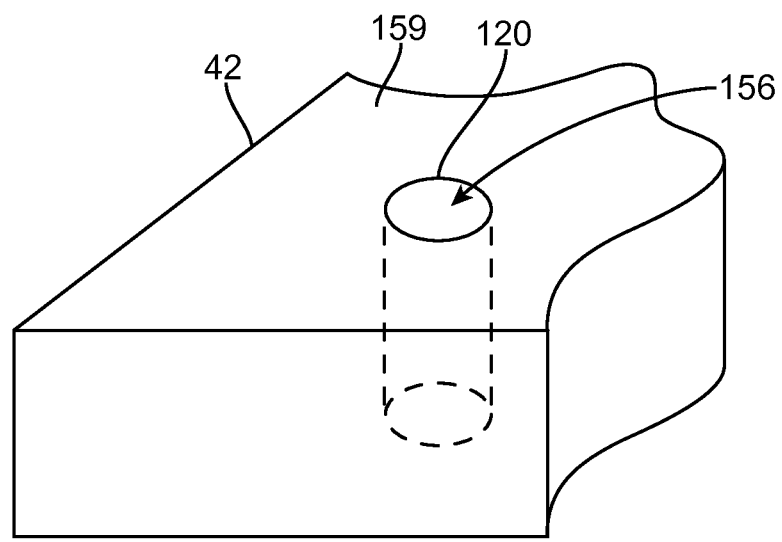
FIG. 19 is a perspective view of illustrative backlight structure alignment features formed from an opening in the backlight structures in accordance with an embodiment of the present invention.

FIG. 19 is a perspective view of backlight structures 42 showing how transparent portions 120 may be formed from an opening such as hole 156 in the backlight structures.

Figure 20:
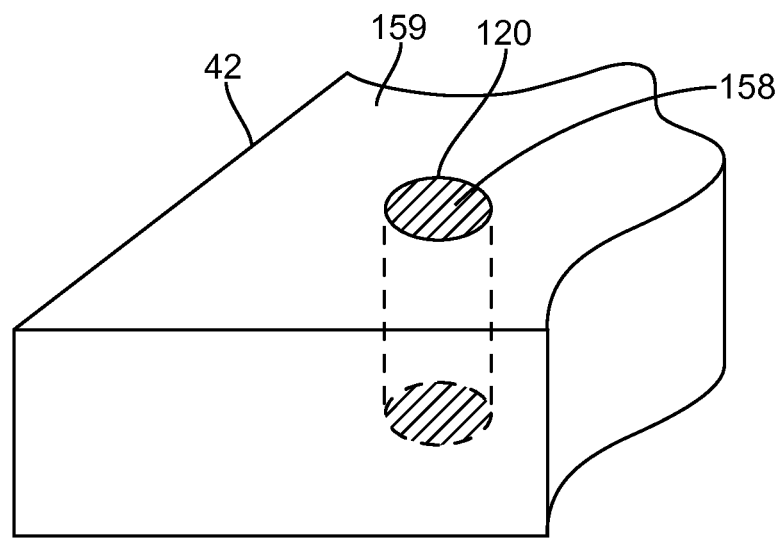
FIG. 20 is a perspective view of illustrative backlight structure alignment features formed from an opening in the backlight structures that is filled with a transparent member in accordance with an embodiment of the present invention.

FIG. 20 is a perspective view of backlight structures 42 showing how transparent portions 120 may be filled by transparent member 158. Transparent member 158 may be formed from plastic, glass or other transparent material.

In one suitable configuration that is sometimes discussed herein as an example, transparent member 120 and surrounding portions 159 of backlight structures 42 may be formed in a multi-shot molding process. For example, portion 159 may be formed from a shot of opaque plastic and transparent member 158 may be formed from a shot of transparent plastic. However, this is merely illustrative. If desired, transparent members 158 may be formed separately from backlight structures 42 and placed into openings such as openings 156 formed in backlight structures 42.

FIGS. 21, 22, 23, and 24 are perspective views of transparent members 158 showing how alignment marks of various types may be formed at various locations on transparent members 158.

Figure 21:
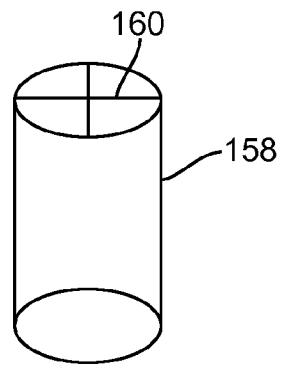
FIG. 21 is a perspective view of an illustrative transparent member of the type shown in FIG. 20 showing how the transparent member may be provided with alignment marks on a top surface in accordance with an embodiment of the present invention.
Figure 22:
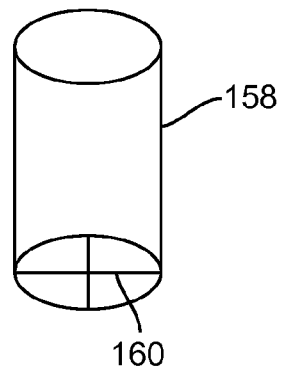
FIG. 22 is a perspective view of an illustrative transparent member of the type shown in FIG. 20 showing how the transparent member may be provided with alignment marks on a bottom surface in accordance with an embodiment of the present invention.
Figure 23:
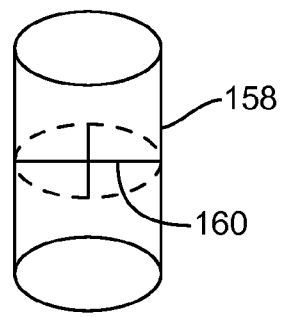
FIG. 23 is a perspective view of an illustrative transparent member of the type shown in FIG. 20 showing how the transparent member may be provided with alignment marks that are embedded within the transparent member in accordance with an embodiment of the present invention.

As shown in FIG. 21, alignment marks 160 may be formed on a top surface of transparent member 158 (i.e., a surface that is formed at or near surface 150 of backlight structures 42). As shown in FIG. 22, alignment marks 160 may be formed on a bottom surface of transparent member 158 (i.e., a surface that is formed at or near surface 152 of backlight structures 42). As shown in FIG. 23, alignment marks 160 may be embedded within transparent member 158.

Figure 24:
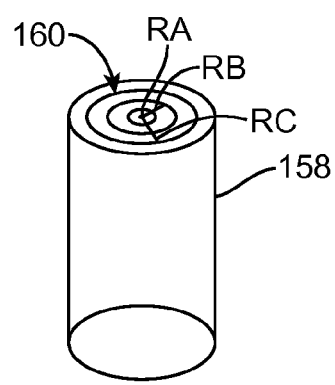
FIG. 24 is a perspective view of an illustrative transparent member of the type shown in FIG. 20 showing how the transparent member may be provided with circular alignment marks having various radii in accordance with an embodiment of the present invention.

In the examples of FIGS. 21, 22, and 23, alignment marks are formed from cross hairs. However, this is merely illustrative. Any suitable alignment marks may be formed on transparent members 158. In the example of FIG. 24, alignment marks 160 are formed from concentric circular marks having known radii such as radii RA, RB, and RC. Alignment marks 160 on transparent members 158 may be aligned with alignment marks 108 on display layers 46 during display assembly operations. Radii RA, RB, and RC may be equal to, or proportional to radii R1, R2, and R3 of FIG. 16.

Alignment marks 160 that are formed on a surface of transparent member 158 may be screen printed, etched, carved, embedded or otherwise formed on a surface of member 158. Alignment marks that are embedded within transparent member 158 may be formed from a material such as metal that is embedded with a transparent material such as plastic or glass when the transparent material is in a liquid form (e.g., during a multi-shot molding process).

Figure 25:
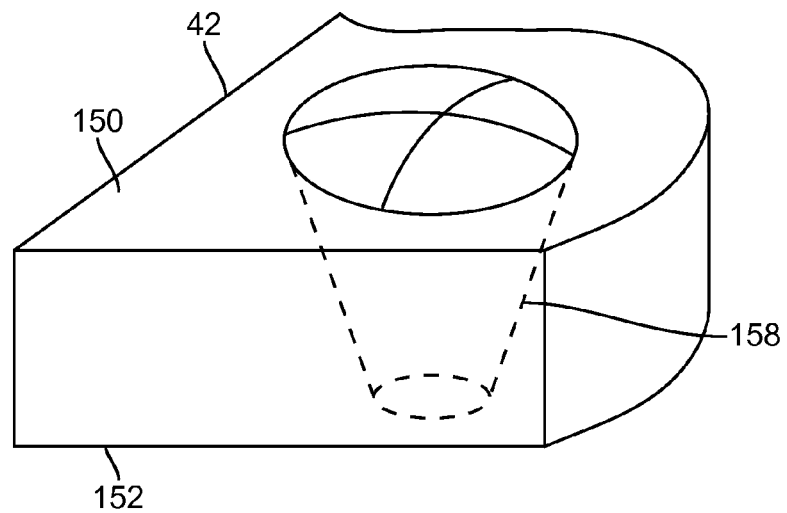
FIG. 25 is a perspective view of an illustrative transparent member of the type shown in FIG. 20 showing how the transparent member may include a lens in accordance with an embodiment of the present invention.

FIG. 25 is a perspective view of a portion of backlight structures 42 showing how transparent member 158 may be formed in the shape of a lens. Providing backlight structures with alignment features formed from transparent members in the shape of a lens may help magnify alignment marks such as marks 108 on display layers 46 during display assembly operations, thereby helping facilitate the alignment of backlight structures 42 with display layers 46.

Figure 26:
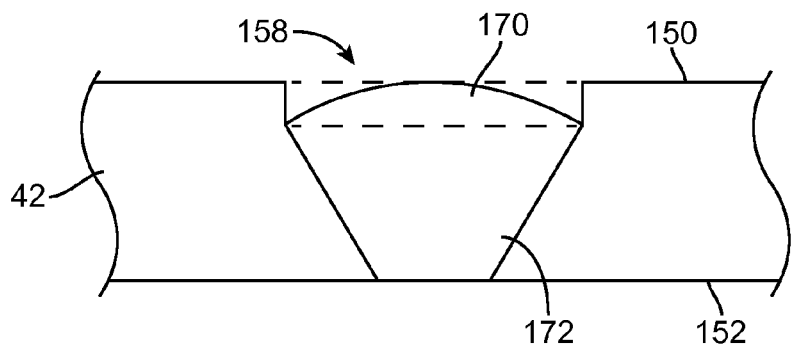
FIG. 26 is a perspective view of an illustrative lens of the type shown in FIG. 25 showing how the lens may include a conical portion and a lensing portion that is formed below an inner surface of the display backlight structures in accordance with an embodiment of the present invention.
Figure 27:
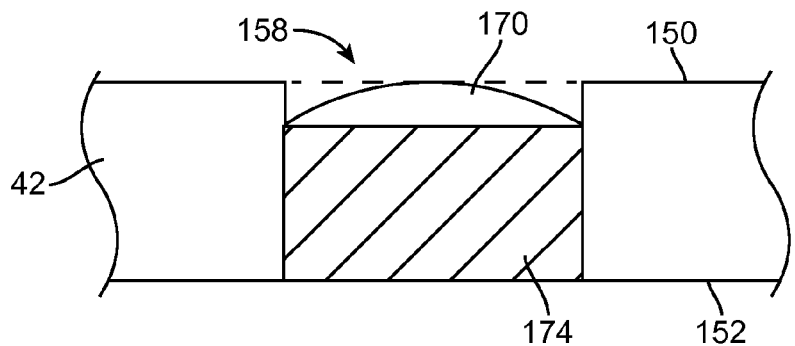
FIG. 27 is a perspective view of an illustrative lens of the type shown in FIG. 25 showing how the lens may include a lensing portion that is formed in a cylindrical opening and below an inner surface of the display backlight structures in accordance with an embodiment of the present invention.

As shown in FIGS. 26 and 27, transparent member 158 may include a lensing portion 170 having an innermost surface that is formed at or below inner surface 150 of backlight structures 42. In the example of FIG. 26, transparent portion 158 includes lensing portion 170 formed over a transparent conical portion 172. However, this is merely illustrative. As shown in FIG. 27, lensing portion 170 may be formed over a cylindrical transparent portion 174. If desired, cylindrical transparent portion 174 may be an empty opening in backlight structures 42. However, if desired, cylindrical transparent portion 174 may be formed form transparent material such as plastic or glass.

Figure 28:
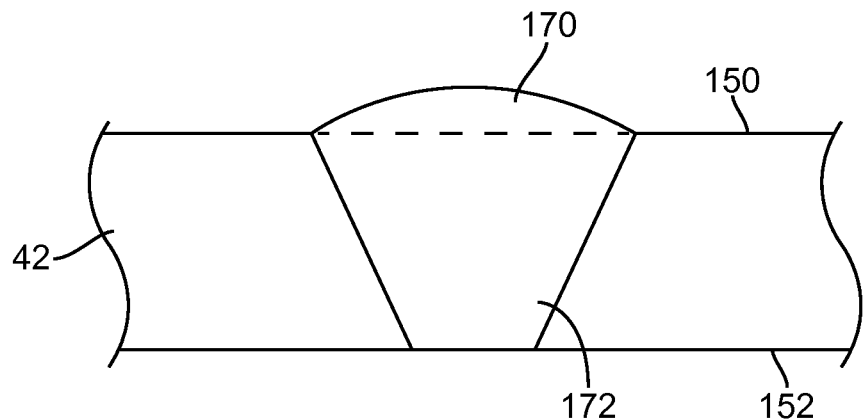
FIG. 28 is a perspective view of an illustrative lens of the type shown in FIG. 25 showing how the lens may include a conical portion and a lensing portion that extends above an inner surface of the display backlight structures in accordance with an embodiment of the present invention.
Figure 29:
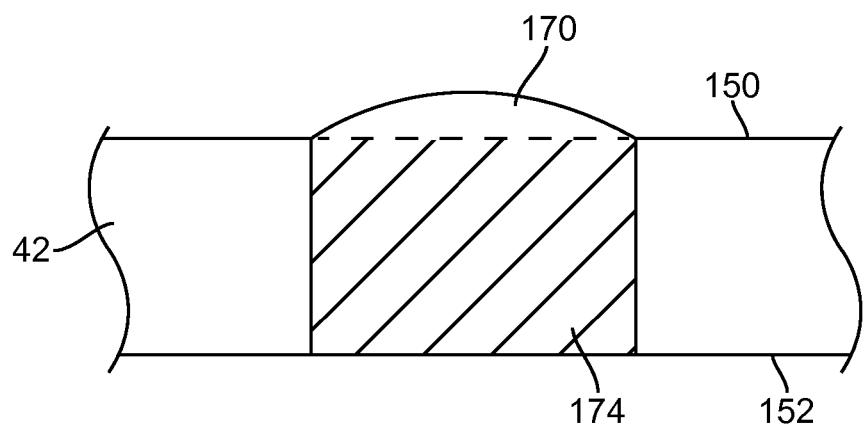
FIG. 29 is a perspective view of an illustrative lens of the type shown in FIG. 25 showing how the lens may include a cylindrical portion and a lensing portion that extends above an inner surface of the display backlight structures in accordance with an embodiment of the present invention.

As shown in FIGS. 28 and 29, transparent member 158 may include a lensing portion 170 having an innermost surface that extends above inner surface 150 of backlight structures 42. In the example of FIG. 28, transparent portion 158 includes lensing portion 170 formed over a transparent conical portion 172. However, this is merely illustrative. As shown in FIG. 29, lensing portion 170 may be formed over a cylindrical transparent portion 174. If desired, cylindrical transparent portion 174 may be an empty opening in backlight structures 42. However, if desired, cylindrical transparent portion 174 may be formed form transparent material such as plastic or glass.

During assembly of device 10 and/or display 14, system 100 (FIG. 7) may be used to align backlight structures 42 to display layers 46. System 100 may use cameras 104 to determine the locations of alignment features on backlight structures 42 and alignment features on display layers 46. System 100 may align the alignment features on backlight structures 42 with the alignment features on display layers 46. However, this is merely illustrative. System 100 may determine a center point on backlight structures 42 using transparent portions 12 and a center point on display layers 46 using marks 108 and align the backlight structures with the display layers by aligning the determined center point of the display layers with the determined center point of the backlight structures.

Figure 30:
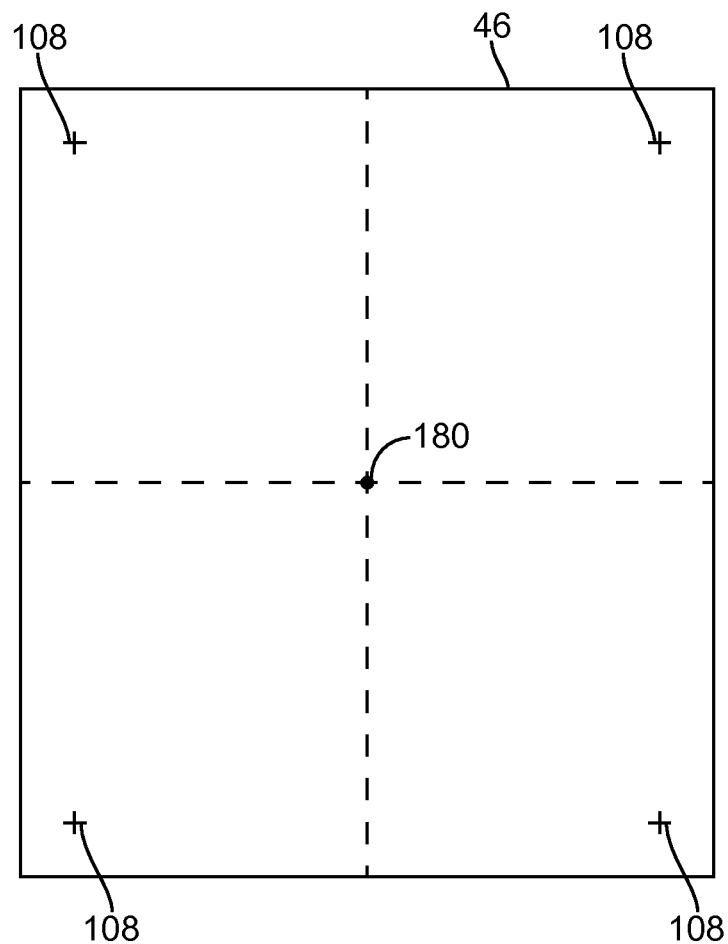
FIG. 30 is a top view of illustrative display layers having alignment marks showing how the alignment marks may be used to determine a center point of the display layers in accordance with an embodiment of the present invention.

FIG. 30 is a top view of display layers 46 showing how alignment marks 108 may be arranged at various know distances center point 180 of display layers 46. System 100 may use cameras 104 to determine the location of marks 108 by viewing marks 108 through transparent portions of structures 42 and use the determined locations of alignment marks 108 and the known distances to point 180 to determine the location of center point 180.

Figure 31:
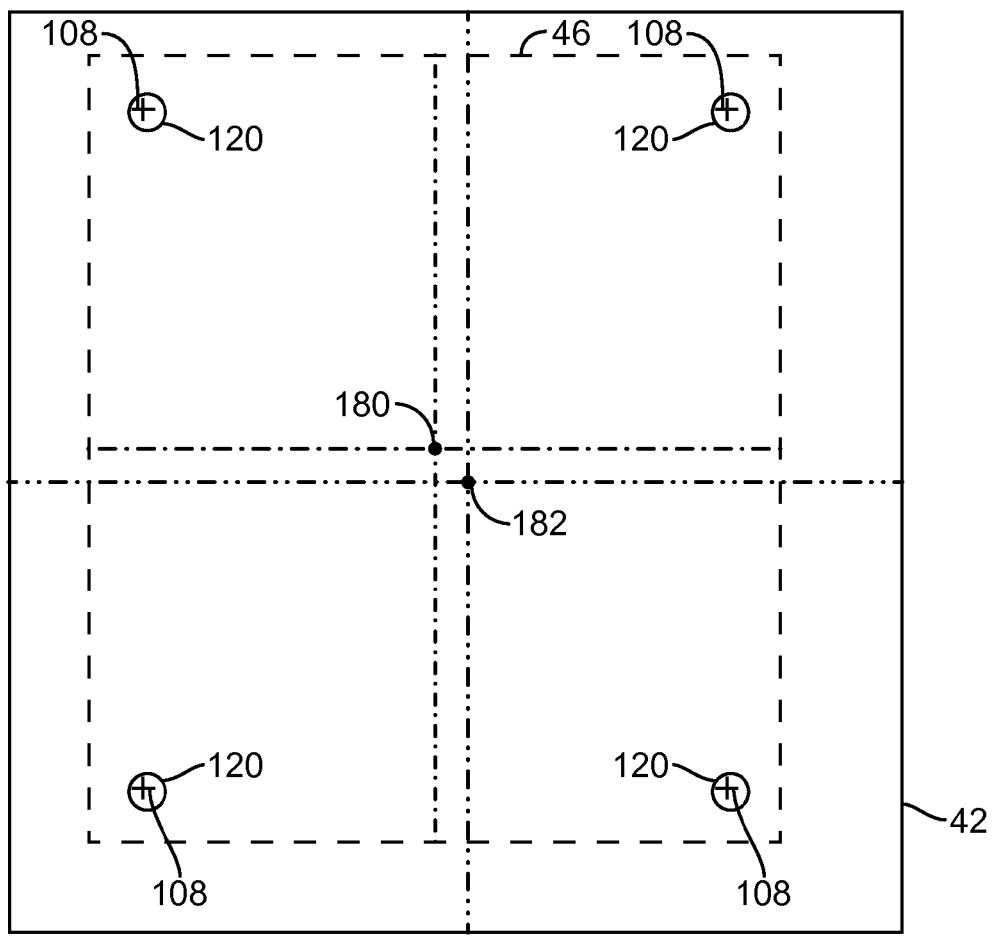
FIG. 31 is a top view of illustrative display layers and backlight structures during alignment operations showing how alignment marks on the display layers may be visible to an assembly system through transparent portions of the backlight structures in accordance with an embodiment of the present invention.

As shown in FIG. 31 transparent portions 120 of backlight structures 42 may be arranged at various known distances from center point 182 of backlight structures 42. During display assembly operations, system 100 may view alignment marks 108 through transparent portions 120 as shown in FIG. 31 and determine the location of center point 180 using alignment features 108 and determine center point 182 using the determined locations and known distances from point 182 of portions 120. System 100 may then use actuating members 106 to move backlight structures 42 until center point 182 is aligned with center point 180.

Figure 32:
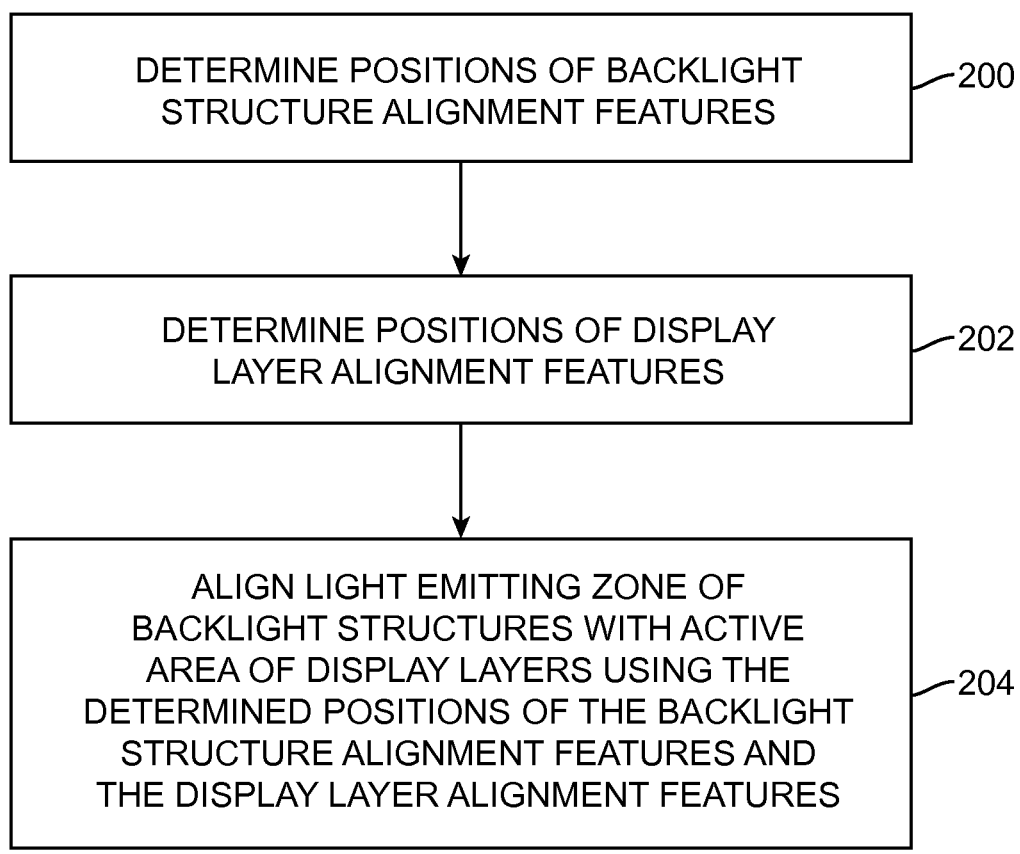
FIG. 32 is a flow chart of illustrative steps involved in assembling a display for an electronic device using alignment features on display layers and alignment features on backlight structures in accordance with an embodiment of the present invention.
Figure 33:
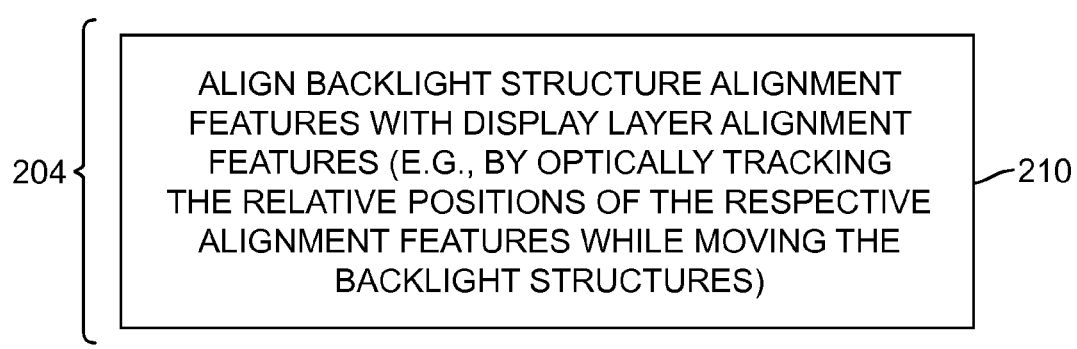
FIG. 33 is a flow chart of illustrative steps involved in aligning display layers and backlight structures as described in FIG. 32 in accordance with an embodiment of the present invention.
Figure 34:
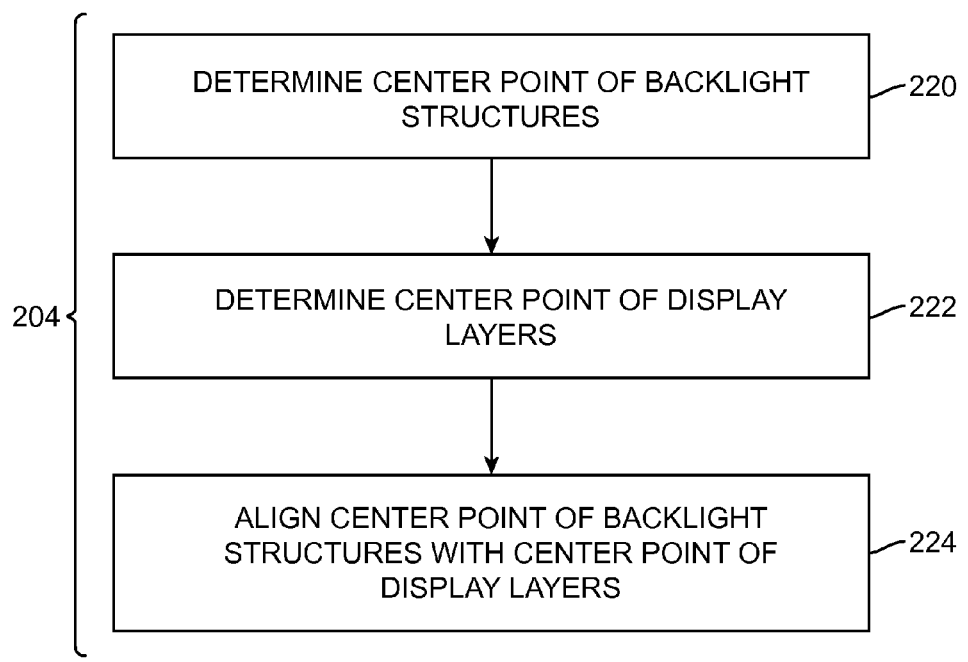
FIG. 34 is a flow chart of illustrative steps involved in aligning center points of display layers and backlight structures as described in FIG. 32 in accordance with an embodiment of the present invention.

Illustrative steps involved in performing display assembly operations using a system of the type shown in FIG. 7 are shown in FIG. 32.

At step 200, the positions of backlight structure alignment features such as transparent portions 120 on backlight structures 42 may be determined. Determining the positions of the backlight structure alignment features may include locating the backlight structure alignment features using cameras 104 and computing equipment 102.

At step 202, the positions of display layer alignment features such as alignment marks 108 on display layers 46 may be determined. Determining the positions of the display layer alignment features may include locating the display layer alignment features using cameras 104 and computing equipment 102.

At step 204, system 100 may align light-emitting zone (LEZ) of backlight structures 42 with active area AA of display layers 46 using the determined positions of the backlight structure alignment features and the display layer alignment features. Aligning the light-emitting zone (LEZ) of backlight structures 42 with active area AA of display layers 46 using the determined positions of the backlight structure alignment features and the display layer alignment features may include aligning the respective alignment features or may include aligning center positions of the display layers and the backlight structures.

Illustrative steps involved in aligning light-emitting zone (LEZ) of backlight structures 42 with active area AA of display layers 46 using the determined positions of the backlight structure alignment features and the display layer alignment features as described in connection with step 204 of FIG. 31 by aligning the respective alignment features are shown in FIG. 32.

At step 210, the backlight structure alignment features may be aligned with the display layer alignment features by, for example, optically tracking the relative positions of the respective alignment features (e.g., using cameras 104) while moving backlight structures 42 (e.g., using actuating member 106).

Illustrative steps involved in aligning light-emitting zone (LEZ) of backlight structures 42 with active area AA of display layers 46 using the determined positions of the backlight structure alignment features and the display layer alignment features as described in connection with step 204 of FIG. 31 by aligning center positions of the display layers and the backlight structures are shown in FIG. 32.

At step 220, system 100 may determine the location of a center point such as center point 182 of backlight structures 42 (e.g., by determining relative locations of alignment features such as transparent portions 120 of the backlight structures).

At step 222, system 100 may determine the location of a center point such as center point 180 of display layers 46 (e.g., by determining relative locations of alignment features such as alignment marks 108 of the backlight structures).

At step 224, system 100 may align the determined center point of the display layers with the determined center point of the backlight structures (e.g., by moving the backlight structures using actuating members 106 until center point 182 is aligned with center point 180).

The foregoing is merely illustrative of the principles of this invention and various modifications can be made by those skilled in the art without departing from the scope and spirit of the invention.

What is claimed is:

1. A display, comprising:
   backlight structures that generates light for the display; and
   at least one display layer that controls emission of the light from the display, wherein the backlight structures comprise a transparent portion, wherein the at least one display layer comprises an alignment mark that is visible through the transparent portion of the backlight structures, and wherein the transparent portion comprises a material selected from the group consisting of: plastic and glass.

2. The display defined in claim 1 wherein the transparent portion of the backlight structures comprises an opening in the backlight structures that extends from a first surface of the backlight structures to an opposing second surface of the backlight structures.

3. The display defined in claim 2, further comprising a transparent member in the opening.

4. The display defined in claim 3 wherein the transparent member comprises glass.

5. The display defined in claim 3 wherein the transparent member comprises plastic.

6. The display defined 3, further comprising an additional alignment mark on the transparent member that is aligned with the alignment mark on the at least display layer when viewed through the transparent member.

7. The display defined in claim 6 wherein the additional alignment mark on the transparent member comprises an embedded alignment mark that is formed within the transparent member.

8. The display defined in claim 1 wherein the at least one display layer comprises a color filter layer and wherein the alignment mark that is visible through the transparent portion of the backlight structures comprises at least one alignment mark on the color filter layer.

9. The display defined in claim 1 wherein the at least one display layer comprises a thin-film transistor layer and wherein the alignment mark that is visible through the transparent portion of the backlight structures comprises at least one alignment mark on the thin-film transistor layer.

10. The display defined in claim 1 wherein the alignment mark that is visible through the transparent portion of the backlight structures comprises a linear alignment mark that extends along an edge of the at least one display layer.

11. The display defined in claim 10 wherein the linear alignment mark is located at a known distance from the edge of the at least one display layer.

12. A display, comprising:
    a backlight unit that generates display light for the display; and
    display layers that control emission of the display light from the display, wherein the backlight unit comprises at least one lens and wherein the display layers comprise an alignment feature that is magnified by the lens when viewed through the lens.

13. The display defined in claim 12 wherein the backlight unit includes an opening that extends from a first surface of the backlight unit to an opposing second surface of the backlight unit and wherein the at least one lens comprises a lensing portion that is formed within the opening.

14. The display defined in claim 13 wherein the lens further comprises a conical transparent member in the opening.

15. The display defined in claim 13 wherein the lens further comprises a cylindrical transparent member in the opening.

16. The display defined in claim 12 wherein the backlight unit includes an opening that extends from a first surface of the backlight unit to an opposing second surface of the backlight unit and wherein the at least one lens comprises a lensing portion that extends from the opening beyond the first surface of the backlight unit.

17. The display defined in claim 16 wherein the backlight unit further comprises a light-emitting zone, and wherein the lens is formed outside of the light-emitting zone.

18. The display defined in claim 16 wherein the backlight unit further comprises at least one additional lens and wherein the display layers comprise at least one additional alignment feature that is magnified by the at least one additional lens when viewed through the at least one additional lens.

19. A method for assembling a display for an electronic device using an assembly system having a camera, wherein the display comprises backlight structures having transparent portions and display layers having alignment features, the method comprising:
    determining locations of the alignment features on the display layers by viewing the alignment features through the transparent portions of the backlight structures using the camera, wherein the transparent portions comprise polymer material; and with the assembly system, aligning the backlight structures with the display layers using the determined locations of the alignment features.

20. The method defined in claim 19 wherein the backlight structures further comprise alignment marks on the transparent portions and wherein aligning the backlight structures with the display layers using the determined locations of the alignment features comprises:
    determining locations of the alignment marks on the transparent portions of the backlight structures; and
    optically tracking the locations of the alignment marks and the locations of the alignment features while moving the backlight structures.

21. The method defined in claim 19 wherein aligning the backlight structures with the display layers using the determined locations of the alignment features comprises:
    determining locations of the transparent portion of the backlight structures.

22. The method defined in claim 21 wherein aligning the backlight structures with the display layers using the determined locations of the alignment features further comprises:
    determining a location of a center point of the backlight structures using the determined locations of the transparent portions; and
    determining a location of a center point of the display layers using the determined locations of the alignment features.

23. The method defined in claim 22 wherein aligning the backlight structures with the display layers using the determined locations of the alignment features further comprises:
    aligning the center point of the backlight structures with the center point of the display layers by moving the backlight structures.

\* \* \* \* \*